(12) United States Patent  
Sunvold

(10) Patent No.: US 8,301,483 B2  
(45) Date of Patent: Oct. 30, 2012

(54) MODELING SYSTEM AND METHOD TO PREDICT CONSUMER RESPONSE TO A NEW OR MODIFIED PRODUCT

(75) Inventor: Gregory Dean Sunvold, Lewisburg, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1134 days.

(21) Appl. No.: 12/015,284

(22) Filed: Jan. 16, 2008

(65) Prior Publication Data

US 2009/0182620 A1 Jul. 16, 2009

(51) Int. Cl.  
*G06Q 10/00* (2012.01)

(52) U.S. Cl. .................................... 705/7.29

(58) Field of Classification Search .......... 705/7.29  
See application file for complete search history.

(56) References Cited

U.S. PATENT DOCUMENTS

| | | | | |
|---|---|---|---|---|
| 6,114,699 A | * | 9/2000 | Barton et al. | 250/339.09 |
| 2003/0195758 A1 | | 10/2003 | Thompson et al. | |
| 2003/0195792 A1 | * | 10/2003 | Thompson et al. | 705/10 |

FOREIGN PATENT DOCUMENTS

| WO | WO 03/087999 A2 | 10/2003 |
|---|---|---|
| WO | WO 2007/122582 A2 | 11/2007 |

OTHER PUBLICATIONS

Meilgaard et al., "Sensory Evaluation Techniques, $3^{rd}$ Edition," *CRC Press*, 1999, pp. 306-324.  
Hair, Jr., et al., "Multivariate Data Analysis with Readings, Fourth Edition," *Prentice Hall*, 1995, (12 pages).  
International Search Report PCT/IB2009/050124, 6 Pages.

* cited by examiner

*Primary Examiner* — Thomas Dixon  
(74) *Attorney, Agent, or Firm* — Amy M. Foust

(57) ABSTRACT

Systems and methods for determining a consumer response. At least two attributes are obtained for a sample product, the at least two attributes are associated with a feeding experience of an animal are determined. A regression analysis is performed on one or more factor scores for the sample product derived from the at least two attributes. A consumer response of the feeding experience as a function of the at least two attributes is determined independently of the consumer. The at least two attributes are determined based on an assessment of a plurality of technical measures associated with the feeding experience of an animal. The technical measures may be selected from the group consisting of analytical components (AN), daily feeding patterns based on automatic feeding station (AFS), chemical sensory headspace aroma compounds (CHEM), human sensory descriptive panel (HUMAN), monadic feeding patterns (VIDEO), and preference assessment (PREF).

24 Claims, 5 Drawing Sheets

MODELING SYSTEM AND METHOD TO PREDICT CONSUMER RESPONSE TO A NEW OR MODIFIED PRODUCT

BACKGROUND

Consumer testing is a technique used to evaluate a level of consumer acceptance of a product idea or prototype prior to introducing the product to the market. The consumer test serves as a "technical measure" of how a prototype product would actually perform if introduced into the market. Unfortunately the consumer testing methodology is limited in its ability to characterize feeding behaviors of animals that might provide greater insights into why animals prefer a certain food.

The predominant conventional practice to measure or predict the success of a new prototype animal food is to feed one product versus another to the animal and determine which product the animal prefers based on some predetermined metrics or technical measures. However, in the context of evaluating the animal feeding experience, consumer testing is more of a measure of the consumer's perception of the animal's feeding experience rather than the consumer's own experience. Unless conducted in the consumer's home, a preference test inherently excludes the interaction of the owner with the animal during the administration of the test (e.g., the test feeding). The owner's viewpoint is generally not available because the preference tests are typically done with kenneled animals. Any judgments made regarding product performance are based entirely on the animal's response to the food (e.g., a metric or technical measure such as the amount of food consumed by the animal). Accordingly, any influence the owner might have on the animal's feeding experience is essentially missing from conventional preference tests. Therefore, conducting a preference test without the presence of the owner is an incomplete measure for assessing the consumer's perception of the animal's feeding experience.

Knowing that the consumer, and not the animal, makes the direct decision to purchase the product, and recognizing the shortcomings of conventional preference tests in assessing the feeding experience of an animal, in home use tests (IHUT) are designed to determine the perception of the animal owner with respect to the performance of the product. Accordingly, in such owner participating animal feeding tests, samples of the food are provided to the owners of the animals. The owners are instructed to feed the sample foods to the animal in their home for a prescribed test period (usually a short period of time such as two weeks or less, for example) and observe the feeding experience. At the end of the prescribed test period, the consumers are administered a survey or questionnaire asking various questions relating to their opinions of various aspects of the food product or feeding experience of the animal including an overall acceptance rating (OAR) question such as: "Considering everything about the animal food you received from us, please indicate the one word or phrase which best describes your overall opinion of this dry pet food. A=Excellent, B=Very Good, C=Good, D=Fair, E=Poor." While this approach to assessing the performance of a sample product may be reflective of how the owner rates the product, administering actual consumer tests is costly, time consuming, and tedious.

The opinion of the consumer is imperative to the success of a food product for an animal. Because this opinion is principally based on the consumer's perception of the animal's feeding experience and administering an IHUT is costly, time consuming, and tedious, there is a need for a predictive modeling technique to predict consumer response to a sample product without performing an IHUT. Furthermore, there is a need to determine a set of technical measures of the characteristics or attributes of a sample product that may be used to predict a consumer response of the sample product without performing an IHUT. There is also a need for a predictive modeling technique to predict the results of an IHUT based on technical measures that can be determined independently of the IHUT.

SUMMARY

In various embodiments, methods and systems of determining a consumer response comprise determining at least two attributes obtained for a sample product. The at least two attributes are associated with a feeding experience of an animal. A regression analysis is performed using the at least two attributes. A consumer response of the feeding experience is determined as a function of the at least two attributes independently of the consumer.

FIGURES

The novel features of the various embodiments are set forth with particularity in the appended claims. The various embodiments, however, both as to organization and methods of operation, together with advantages thereof, may best be understood by reference to the following description, taken in conjunction with the accompanying drawings as follows.

DESCRIPTION

Figure 1:
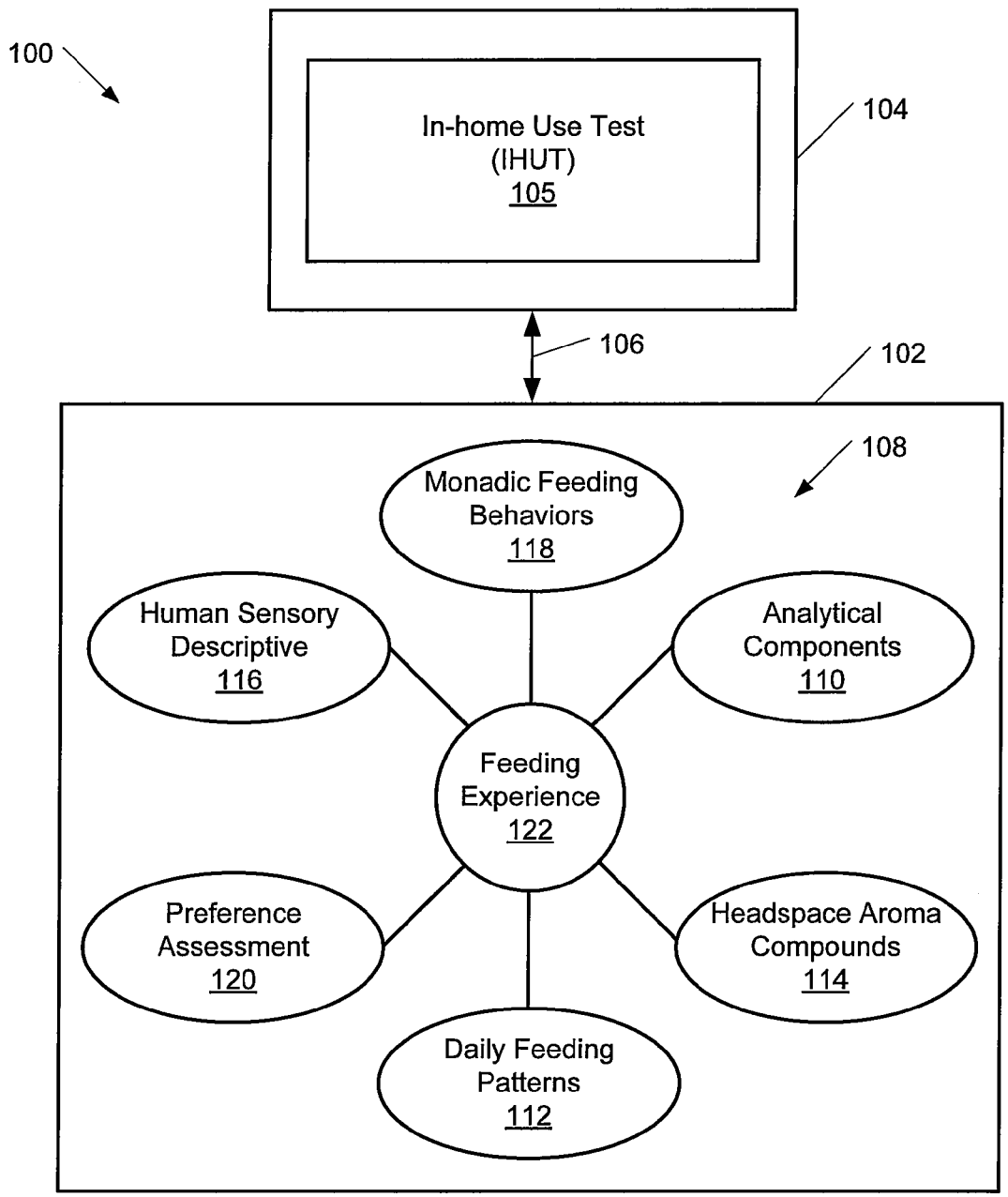
FIG. 1 is a diagram of a model of the sensory feeding experience of an animal.

Before explaining the various embodiments in detail, it should be noted that the embodiments are not limited in their application or use to the details of construction and arrangement of parts illustrated in the context of the accompanying drawings and description. The illustrative embodiments may be implemented or incorporated in other embodiments, variations and modifications, and may be practiced or carried out in various ways. For example, the embodiments configurations disclosed below are illustrative only and not meant to limit the scope or application thereof. Furthermore, unless otherwise indicated, the terms and expressions employed herein have been chosen for the purpose of describing the illustrative embodiments for the convenience of the reader and are not limited in this context.

In one embodiment, technical measures using sensory research techniques are employed to create a predictive model suitable to predict a consumer response of the feeding experience of an animal independent of the consumer. It is to be understood that the term consumer is used at least in part to refer to the owner or caretaker of the animal. It is further to be understood that the term animal includes companion animals such as dogs, cats, horses, gerbils, mice, rats, and ferrets. The predictive model is derived from various technical measures or attributes that characterize or assess the feeding experience of an animal without interaction from the consumer. The technical measures each result in one or more attributes that are used to create one or more factors that provide insight into the feeding experience of the animal. The term technical measure is intended to include research tests that describe: (1) the animal's response to the food; (2) the product itself; and/or (3) the consumer's perception of the animal's response to the food. These technical measures result in one or more attributes that describe the feeding experience of the animal. The feeding experience of the animal includes any and all attributes obtained from the aforementioned technical measures. Technical measures that describe the animal's response to the food includes any objective measure that is conducted by measuring the response of the animal to the presentation of a meal or eating of food throughout a 24 hour period. Examples of such technical measures include but are not limited to preference assessment, monadic video behaviors, or daily feeding patterns. Technical measures that describe the product itself include any physical, analytical, or chemical tests that describe the product. Examples of such technical measures include but are not limited to headspace aroma and analytical assessment of chemical aspects of the product. Technical measures that describe the consumer's perception of the animal's response to the food include any tests designed to gain insight into consumer's perceptions of the animal's experience with the food. Examples of such technical measures include but are not limited to focus groups with consumers and in home assessment of a sample product's performance by trained expert consumers. The attributes are analyzed to generate factors that are linear combinations of the attributes. Factor scores are generated for each of the sample products. The factor scores may be used in various statistical regression techniques to predict a consumer response independent of consumer input such as in an IHUT. For example, the factor scores may be used in a variety of multivariate regression techniques such as the principal components regression (PCR) technique and the partial least squares (PLS) technique.

In the context of the present embodiments, sensory research is used to measure, model, and interpret characteristics of sample products as they are perceived and integrated by the senses of sight, sound, smell, taste, and touch. A series of "technical measures" associated with predictive variables employ sensory research techniques to assess the feeding experience of an animal. The technical measures provide more detailed information relating to the feeding experience of an animal than a consumer test, but are determined independently of the consumer.

The consumer response predicted by the predictive model may be employed to assess differences in measured product characteristics, i.e., the technical measures. How variations in the attributes of these technical measures affect the consumer response (e.g., OAR) may be determined without an IHUT test. If there are a large number of attributes associated with the technical measures, a subset of key technical measures may be identified to simplify the statistical computations used to create the predictive model. Statistical analysis techniques may be used to reduce the number of variables, simplify the statistical computations, and help with interpretation of the data. Because these statistical techniques are well known, for the sake of succinctness, details of these computational techniques are described only superficially to provide some guidance in understanding the predictive modeling technique. The predictive modeling technique may be employed to predict consumer response without an IHUT, but based only on a subset of key technical measures.

A plurality of technical measures are initially determined. The technical measures are associated with the attributes or characteristics of one or more products that best predict the consumer acceptance of the one or more products. The plurality of technical measures are used to assess a feeding experience of an animal against known consumer acceptance data based on an IHUT. One or more attributes identified from the technical measures are analyzed using statistical techniques to generate a plurality of factors. One statistical analysis technique is a principal component analysis (PCA), although other statistical techniques may be employed. Factor analysis techniques are applied to the attributes to combine the individual attributes into a smaller number of dimensions. The most important factors are referred to as "key drivers." The PCA may identify one or more groups of variables that are highly correlated with each other to reduce the number of variables needed to adequately summarize the total variability. These highly correlated factors (e.g., key drivers) are used to identify the most important variables that contribute to the prediction of the consumer response. The "key drivers" provide insight with respect to characteristics or attributes of the one or more products that are likely to be favorably accepted by a consumer. In one embodiment, a predictive model may be created by applying statistical regression techniques to a plurality of factor scores developed for each of the one or more products. The predictive model subsequently can be used to predict consumer response without performing an IHUT. In various embodiments discussed herein below, the predictive model is based on a data set that includes sensory data as well as analytical data. The data sets are stored in a database. As additional data is continuously acquired, the predictive model yields more predictable consumer responses based on an increasingly larger dataset making up "known" values for both technical measures (attributes) data and consumer response data. It will be appreciated that other embodiments of the predictive model discussed herein may be applicable to other products.

FIG. 1 is a diagram of a model 100 of the sensory feeding experience of an animal. The model 100 is a combination of objective (technical) assessments 102 and consumer assessments 104 of the feeding experience 122 of an animal. Results of the technical assessment 102 are regressed against the results of the consumer assessment 104. The results of the technical assessment 102 are referred to as product attribute data 108 while the results of the consumer assessment 104 are referred to as consumer acceptance 105 data, e.g., the actual or empirical consumer responses to the feeding experience 122 of the animal, otherwise known as consumer acceptance ratings. The attributes 108 may comprise sensory descriptive evaluations of the feeding experience 122. A general consumer response predictive model may be created by linking 106 the attributes 108 data set with the consumer acceptance 105 data set. The general consumer response predictive model predicts a consumer response (e.g., consumer acceptance) based on the feeding experience of the animal independent of the consumer assessment 104 (e.g., without the necessity of conducting an IHUT). The consumer independent prediction of consumer response may be determined without incurring expenses to conduct an actual consumer assessment, provides significant advantages, and may be employed to improve product attributes to achieve an improved overall rating of the product.

In the illustrated embodiment, the technical assessment 102 portion of the model 100 comprises six technical measures to generate the attributes 108. As described in more detail below, factors (sometimes referred to as "predictor variables") are selected based on a factor analysis of the attributes 108. The attributes 108 describe the animal feeding experience using sensory as well as analytical technical measures. In the context of the present embodiments, sensory measures include interpretation of the characteristics or attributes of a sample product as they are perceived and integrated by the senses of sight, sound, smell, taste, and touch. Analytical measures include the use of devices to obtain actual measurements of desired attributes of the sample product. A series of technical measures are used to assess the feeding experience of an animal to determine a set of attributes 108. The technical measures provide more detailed information relating to the feeding experience of an animal than a consumer test and are determined independently of the consumer. In the illustrated embodiment, the attributes 108 are characterized in accordance with a plurality of attributes from a plurality of sensory as well as analytical data sources. In the illustrated embodiment, the attributes 108 describe the feeding experience 122 based on analytical components 110 (AN), daily feeding patterns 112 based on automatic feeding station (AFS), chemical sensory such as headspace aroma compounds 114 (CHEM), human sensory descriptive panel 116 (HUMAN), monadic feeding patterns 118 (VIDEO), and preference assessment 120 (PREF). In other embodiments, the attributes 108 may include attributes from additional or fewer data sources. Examples of automatic feeding stations are well known in the art.

TABLES 1-6 indicate various specific sensory and analytical attributes that may be used to characterize the feeding experience 122 based on the attributes 108 data. A consumer response predictive model of the feeding experience may be created based on the most important attributes or key drivers for predicting the consumer acceptance of a product. The most important attributes will vary in accordance with a specific product for which a consumer acceptance prediction is being sought.

TABLE 1 indicates various examples of attributes based on analytical components 110 (AN) of a product that provide a quantitative measure of the macronutrients contained in the product. The analytical components 110 may be employed to characterize the feeding experience of an animal. The attributes based on the analytical components 110, however, are not limited to those listed in TABLE 1. Accordingly, the embodiments are not limited in this context.

TABLE 1

Acid Hydrolysis Fat (%)
Ash (%)
Crude Fiber (%)
Moisture (%)
Protein (%)
Other Chemical Components (%)

TABLE 2 indicates various examples of attributes based on the daily feeding patterns 112 (AFS) of an animal. In one embodiment, these analytical attributes may be obtained from the AFS. The daily feeding patterns 112 of the animal may be employed to characterize the feeding experience of an animal. The attributes based on the daily feeding patterns 112, however, are not limited to those listed in TABLE 2. Accordingly, the embodiments are not limited in this context.

TABLE 2

Amount of Food in Weight (e.g., Grams) Consumed by the Animal at the First Event of the Day
Average Amount of Food Consumed per Event (G)
Duration at Bowl for First Event of Day (sec)
Max. Consumed in 1 Event (g)
Max. Time at Bowl in 1 Event (sec)
Mean Time at Bowl per Feeding Event (sec)
Min. Time at Bowl in 1 Event (sec)
Number Of Feeding Events
Rate of Eating (gm/min)
Rate of Eating at First Event of Day (g/min)
Time to First Event of Day (min)
Total Amount Consumed (g)
Total Time at Bowl in Study Day (sec)

TABLE 3 indicates various examples of attributes based on headspace aroma compounds 114 (CHEM) associated with the product. These aroma compounds volatilize into the atmosphere directly above the product and may be measured analytically to characterize the product and the feeding experience of an animal. The headspace aroma compounds 114 may be measured using a chemical sensor to quantify traces of compounds in the parts per billion range. The headspace is the atmosphere directly above the product where the aroma compounds volatilize. The attributes based on the headspace aroma compounds 114, however, are not limited to those listed in TABLE 3. Accordingly, the embodiments are not limited in this context.

TABLE 3

HC, Aldehydes
2,4-Octadienr (Fish Oil)
2,6-Dimethylpyrazine, 2-Ethylpyrazine
2/3-Methyl-Butanal, Aldehydes
2-Etylfuran, 2-Pentylfuran, 2,4-Hehprdienal
2-Hexenal, 2-P-Cyclopentane (Fish Oil)
2-Hexenol, 2-Pentenol (Fish Oil)
2-Methyl Butanal
2-Pentyl Furan
3-M-Butanal
Acid, Acetic, Butanoic
Benzaldehyde
Benzaldehyde
Butanoic Acid, 2-M-Butanoic Acid
Cyclopentane, 2,4-Octadiene
DMDS
DMMS
DMTS
Furan
Furfural
Furfural, 3,5-Octadiene-2-One
HC, Hexane, Aldehydes
Heptanal, Isoamyl Alcohol
Hexanal
Hexanal, 2-M-Propanal, Butanal, 2-Butanone
Methional
Nonanal
Octanal
Propanal, TMA (2x Of 59)
Propanoic Acid
Propyl Acetate
Pyrazine
TMA (½ Of 58)

TABLE 4 indicates various examples of sensory attributes determined by the human sensory descriptive panel 116 (HUMAN). These sensory based assessments may be employed to characterize the feeding experience of an animal. Two separate aspects of the human sensory descriptive technique are the aroma and appearance attributes of the product. For example, a sample of the product may smell fishy and/or appear grainy. Additional examples of the sensory attributes determined by the human sensory descriptive panel 116 are listed in TABLE 4 below. The sensory attributes determined by the human descriptive panel 116, however, are not limited to those listed in TABLE 4. Accordingly, the embodiments are not limited in this context.

TABLE 4

Beefy
Cardboard
Chicken
Dirty Socks
Earthy
Fish
Grainy
Oily/Fatty
Overall Meaty
Sweet
Toast
Yeast TABLE 5 indicates various examples of sensory attributes determined by the monadic feeding behaviors 118 (VIDEO) of the animal. A video camera may be employed to record specific bodily movements of the animal associated with eating a meal. The recorded monadic feeding behaviors 118 are used to characterize the feeding experience of an animal. The sensory attributes determined by the monadic feeding behaviors 118 of the animal, however, are not limited to those listed in TABLE 5. Accordingly, the embodiments are not limited in this context.

TABLE 5

At Bowl Licks Lips
At Bowl Looks Up
At Bowl Shakes Ears
At Bowl Sits Down
At Bowl Stands While Eating
At Bowl Tail Down
At Bowl Tail On Floor
At Bowl Tail Up
At Bowl Throw Food Out Of Bowl
At Bowl Wags Tail
Ate From Far Side Of Bowl
Ate From Front Of Bowl
Ate From Left Side Of Bowl
Ate From Right Side Of Bowl
Drops Kibbles On Floor To Eat
Eats Eagerly
Eats Food At Back Edge Of Bowl
Eats From Bowl
Eats Normally
Exploring Room
Gulping (# Times)
Leaves Bowl & Return (# Of Time)
Lick Lips After Eating Food
Licking Lips (# Time)
Meowed (# Time)
Moves Closer To Bowl
Paws Against Edge Of Bowl
Paws Away From Edge Of Bowl
Paws In Food Bowl
Shake Head
Shakes Ears
Sits While Eating
Sniff Bowl And Eat
Sniff Bowl And Walk Away
Stands While Eating
Stayed At Bowl Until Finished
Straight To Bowl - Eats Immediately
Straight To Bowl - Hesitates Then Eat
Straight To Bowl - Sniff & Walk Away
Straight To Exploring Room
Time At Bowl (Min/Sec)

TABLE 6 indicates various examples of attributes based on the preference assessment 120 test to measure attributes for characterizing the feeding experience of an animal. As previously discussed the preference assessment 120 technique is an industry standard tool for assessing the choice between two products (i.e., liking). The attributes based on the preference assessment 120 test, however, are not limited to those listed in TABLE 6. Accordingly, the embodiments are not limited in this context.

TABLE 6

First Bite Average
Percent Converted Food Intake Average (%/Animal/Day)
Preference Based On Volume
Preference Converted Food Intake
Preference Segmentation (%)
Total Average Volume (G/Day)

The above mentioned attributes 108 are used to define the independent variables (e.g., x) used in the statistical technique to predict the consumer response, which is the dependent variable (e.g., y). The attributes 108 indicated in TABLES 1-6 comprise a broad and rich list of attributes associated with a product and how it may be related to the feeding experience of an animal. The attributes 108 may be employed to characterize and describe the feeding experience 122 of the animal and to create a model to predict a consumer's response to the animal eating the product. However, when a large number of attributes, such as those collectively listed in TABLES 1-6, are associated with the attributes 108, not all attributes collected are indicative of the consumer's response. Accordingly, statistical techniques may be employed to reduce the number of attributes 108 associated with each to those that yield the most important key drivers that provide suitable insight with respect to the product characteristics or attributes that are likely to be favorably accepted by a consumer. Such statistical techniques may be referred to as variable reduction techniques. As discussed above, those skilled in the art will appreciate that the attributes listed in TABLES 1-6 are merely examples of sensory and analytical attributes that may be used to characterize the feeding experience 122. These examples are not exhaustive and the embodiments are not limited in this context.

A predictive model may be based on actual (empirical) data, such as the technical assessments 102 data and the consumer assessments 104 data associated with the feeding experience 122 of an animal. The technical assessments 102 and consumer assessments 104 empirical data may be obtained from a plurality of existing sample products where empirical data associated with the attributes 108 as well as actual IHUT observed consumer responses are known. Once the predictive model is created based on the known objective assessments 102 and the consumer assessments 104 data, the predictive model may be employed to predict future consumer responses, such as consumer acceptance, based only on the attributes 108, which are readily obtainable independent of the consumer. Accordingly, one benefit of the predictive model is the ability to predict consumer acceptance without administering an IHUT and soliciting responses from the consumer. Additional benefits of the predictive model include, for example, identifying specific attributes for improving the performance of a prototype product, identifying gaps between existing commercial products, and describing how new prototype products may be developed in a manner that differentiates them from existing products. Other benefits of the predictive model include predicting how a prototype might perform with consumers including reducing time and money wasted testing poor prototypes; improving the success rate of new prototypes in consumer tests; and identifying specific attributes of prototypes that could then be improved to result in better consumer response to the prototypes.

Figure 2:
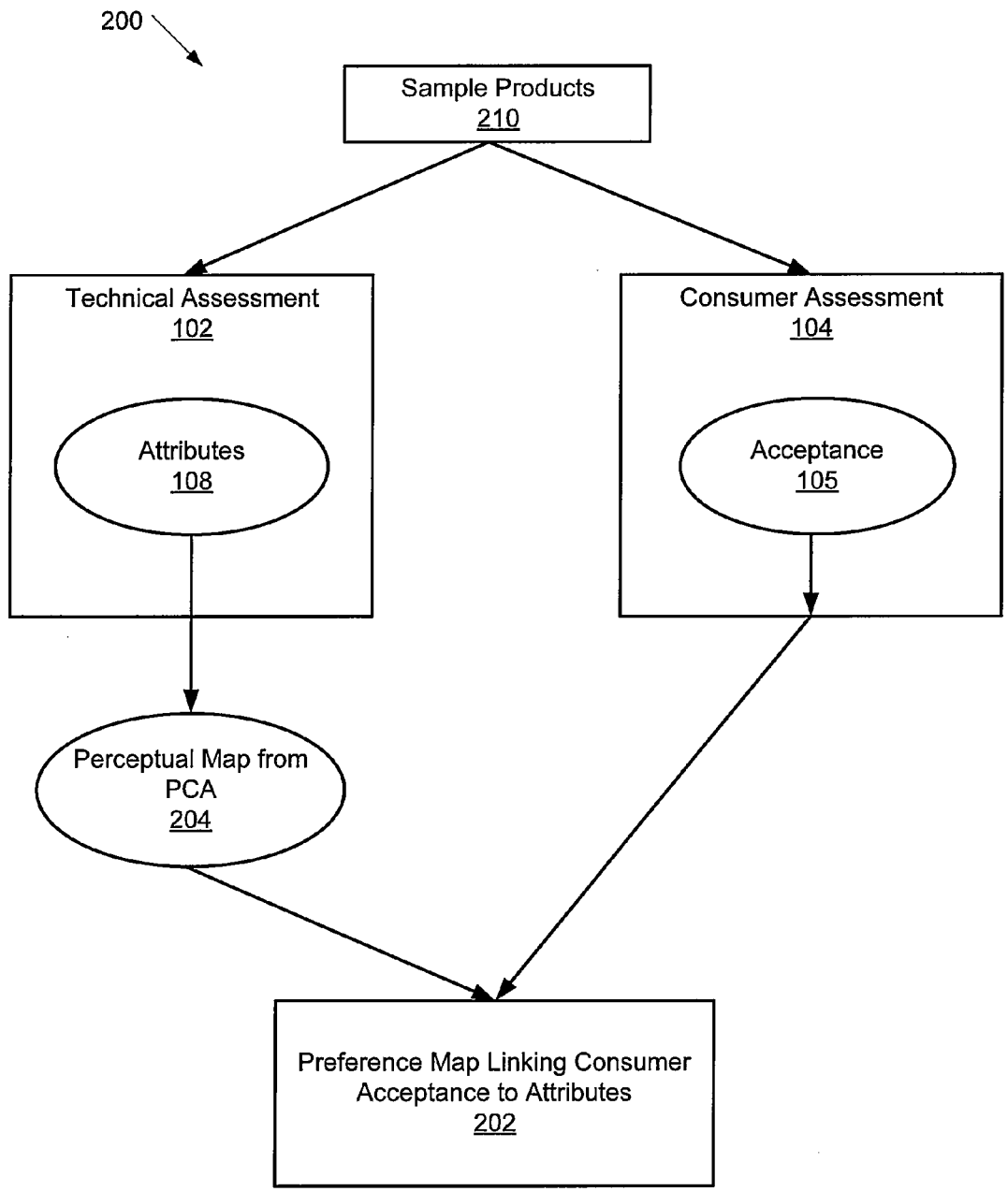
FIG. 2 is a schematic diagram of a statistical analysis technique for generating a predictive model based on technical measures and consumer data.

FIG. 2 is a schematic diagram 200 of a statistical analysis technique for generating a predictive model based on empirical sensory and consumer data. In one embodiment, the predictive model can predict the consumer acceptance 105 data based on the feeding experience 122 (FIG. 1) of an animal. A first portion of the analysis includes a sensory analysis represented as the technical assessment 102 to generate the attributes 108 identified for each of the sample products 210 (e.g., Samples-1-7). The attributes 108 may be determined based on sensory as well as analytical variables. A perceptual map 204 is created using a PCA or factor analysis of all the attributes 108. The consumer assessment 104 portion of the analysis obtains consumer acceptance 105 data using any well known consumer testing techniques such as IHUT, for example.

The perceptual map 204 is used in a statistical technique for summarizing the attributes 108 of the sample products 210. As used herein, sample products may include commercial products as well as prototype (non-commercialized) products. The groups of highly correlated attributes called dimensions or factors that account for large proportions of the total variation exhibited by the total number of attributes 108 are identified. The attributes 108 are grouped onto a small number of key sensory dimensions based on how each of the attributes 108 correlate with each other. The maximum amount of sensory variability with the fewest number of dimensions is determined to simplify interpretation of data. The sample products 210 are located on the key dimensions to illustrate similarities and differences in their sensory properties.

The empirically determined overall consumer acceptance 105 data for each of the sample products 210 are overlaid on the perceptual map 204 to identify the dimensions (e.g., factors or key drivers) of liking of the sample products 210. The predictive model is created by suitable regression techniques using the factor scores of the sample products 210 determined from a PCA of the attributes 108. The factor loadings within the dimensions reveal the most important attributes 108 that describe the dimension. The resulting model predicts the point (e.g., the target) on the perceptual map 204 that represents the most well liked product, even if that product does not currently exist.

Sensory evaluation techniques often involve the determination of relationships between different variables. Sensory evaluation techniques may employ a variety of statistical techniques to create predictive models based on the attributes 108 (e.g., technical measures) data sets. Although other techniques may be employed, two such techniques are described herein. These are the PCR technique and the PLS technique. Both techniques involve attribute reduction techniques, which will now be discussed.

PCA is a technique used to reduce multidimensional data sets to lower dimensions for analysis and may be employed for making predictive models. An initial correlation of a group of variables obtained from the technical assessment 102 may identify one or more groups of highly correlated variables known as factors. Accordingly, a smaller number or subset of the initial group of variables contains related information such that a smaller number of variables provide an adequate description of the variability of the original data set. PCA is a statistical technique designed to identify the smallest number of variables, called "Principal Components," that explain the greatest amount of variability in the original data set. PCA involves the calculation of the eigenvalue decomposition or Singular value decomposition of a data set, usually after mean centering the data for each attribute. Computer techniques to extract the principal components from a set of multivariate data are well known to those skilled in the art and for succinctness the computational and implementation details of such techniques are not discussed herein. Analytical discussions of PCA may be obtained from Piggott, J. R. and Sharman, K. 1986, "Methods To Aid Interpretation Of Multidimensional Data" In: Statistical Procedures In Food Research, J. R. Piggott, Ed., pp. 181-223, Elsevier Applied Science, London, which is incorporated herein by reference.

To determine the major differences between the sample products 210 (e.g., Samples-1-7), the attributes 108 are analyzed using a factor analysis technique. The factor analysis combines the individual sensory attributes 108 into a smaller number of key dimensions (or factors). The attributes 108 that are highly correlated with each other are grouped on the same dimension. In one embodiment, a factor analysis may comprise the execution of various functions, such as, for example: selecting variables (i.e., sensory attributes) to analyze; controlling an output with a plurality of "options"; generating a Scree Plot (e.g., a graph that shows the fraction of the total variance in the data that is explained or represented by each principle component (factor)) to help select the number of dimensions; rotating the solution to make it easier to interpret the data; reordering factor loadings to make it easier to interpret the solution; displaying only meaningfully large factor loadings; selecting a number of dimensions; and outputting factor scores for each of the sample products 210. The term "factor loadings" is used to describe correlations of the individual attributes 108 with the dimension they are associated with. The factor loadings are used to interpret the variability that is being explained by each key dimension. Once the perceptual map 204 of the sensory space of the sample products 210 has been created using factor analysis, a link between the attributes 108 data set and the consumer acceptance 105 data set can be determined. Software programs like Design Expert® made by Stat-Ease, Inc. provide suitable computational tools to build the link and to present the results in a clear, easy-to-understand format. Subsequently, preference maps may be used to identify which of the attributes 108 are significant drivers of liking (e.g., significant drivers of a particular consumer response). Preference maps are generally first-order (linear terms only) or second-order regression equations (linear and quadratic terms).

Each of the sample products 210 is assigned a factor score for each key dimension. The "factor score" is a single number for each dimension that best represents the relative differences among the sample products 210 for the entire bundle of highly correlated attributes. The factor scores reveal the major similarities and differences among the sample products 210 that would otherwise be lost in the noise of the individual attributes 108. Once the factor scores are determined for each of the sample products 210, a regression analysis is performed using the factor scores as the independent variables and the consumer acceptance 105 data as the dependent variables. The regression analysis may be based on one or more regression techniques. The regression techniques fit predictive models to responses using the factor scores as predictors. Factors are assessed by the significance of slope coefficients, $\beta$'s, in the model. Factors with significant slope coefficients may have a significant impact on the model. A consumer response "Y" may be represented as the following equation:

$$Y = \beta_0 + \beta_1 X_1 + \beta_2 X_2 + \beta_{11} X_1^2 + \beta_{22} X_2^2 + \ldots$$

Y=Consumer Response.
$X_1$ and $X_2$=Factor Scores of Sample Products.
$\beta$=Slope Coefficients.

Squared terms are used to fit curved relationships. If the slope β coefficient is statistically significant (i.e., different from zero), then that term has a significant effect on the response.

A preference map 202 linking the consumer acceptance 105 data with the principal component or key drivers data from the perceptual map 204 is generated using a suitable regression technique. The preference map 202 technique is a type of external preference mapping technique and may be performed on data sets that attempt to link the attributes 108 data with the consumer acceptance 105 data for each of the sample products 210. Any suitable statistical regression techniques may be employed to generate the predictive model based on the sensory descriptive data attributes 108 and the consumer acceptance 105 data. In one embodiment a multivariate regression technique may be employed. Two examples of such multivariate regression techniques are: (1) PCR; and (2) PLS regression. Either of these regression techniques may be employed to create the predictive model. The preference map 202 links the consumer acceptance 105 data to the highly correlated dimensions or factors determined from the attributes 108 data using the perceptual map 204 technique. The preference map 202 technique may be employed to predict consumer acceptance of a new product based on the attributes 108 of each of the sample products 210. The preference map 202 enables analysis of key drivers of liking for predicting consumer acceptance based on sensory and analytical product characteristics that drive acceptance. This enables one to focus on future product improvement efforts in the areas that will have the greatest impact with consumers.

The PCR regression technique may be applied to predict consumer acceptance. The PCA is performed on the average attributes 108 (e.g., technical measures) associated with each of the sample products 210. A set of factor scores is obtained for each product sample 210 and are used as predictor variables in a regression analysis to predict consumer acceptance. The factors determined from the PCA are the underlying dimensions of variability in the technical measures of the attributes 108 and can be interpreted based on factor loadings. The attributes 108 with large positive or negative loadings from +1 to −1 on a single factor define that factor. If the factor is a significant driver of acceptance, the attributes 108 associated with the factor influence the consumer acceptance 105 data. The results of the PCA are usually discussed in terms of component scores and loadings. The factors identified with the PCA are ranked based on how much variability in the original data set each factor accounts for. The first ranked factor accounts for the most variability in the original descriptive data set and the last ranked factor accounts for the least.

The PLS regression technique may be applied to predict consumer acceptance. However, instead of finding the maximum sensory variability, the PLS regression technique finds a linear model describing some predicted variables, e.g., consumer acceptance variables 208, in terms of other observable variables, e.g., average attributes 108 of each of the sample products 210. A PLS technique will try to determine a multidimensional direction in the horizontal space that explains the maximum multidimensional variance direction in the vertical space.

The PLS regression technique locates the test products on the map using both the attributes 108 and the consumer acceptance 105 data. PLS maps are generated by performing a preliminary factor analysis on the attributes 108 and then rotating the preliminary solutions, factor-by-factor, to maximally align with the consumer acceptance 105 data. Relationships between the attributes 108 and the consumer acceptance 105 data are obtained from a single analysis. PLS can be used to model multiple consumer responses simultaneously. For example, acceptance data from several segments of consumers can be modeled in a single analysis.

Both PCR and PLS regression techniques are widely applied in the field of sensory evaluation. Computations performed in accordance with these multivariate regression techniques are well known to those skilled in the art and for succinctness the computational and implementation details of these regression techniques are not discussed herein.

Other preference mapping techniques include Internal Preference Mapping (IPM) and External Preference Mapping (EPM). IPM locates the test products on the map using only the consumer acceptance 105 data. Internal Preference Maps are generated by performing a factor analysis on the overall liking ratings of the consumers. The sample products are represented as rows of data and each consumer is represented in a column of data. Relationships with the attributes 108 are assessed using correlation analysis. EPM locates the sample products on the map using only the attributes 108. EPMs are generated by performing factor analysis on the sensory attributes. Sample products are represented as rows of data and average attribute intensities are represented as columns of data. Relationships with the consumer acceptance 105 data are assessed using regression analysis.

As an illustrative example of the application of the above factor analysis, a sample of seven products Samples-1-7 are used in the PCA to create a predictive model. For purposes of this illustrative example, it is assumed that the consumer assessment 104 data from IHUTs is known for each of the seven Samples-1-7. It is also assumed that the technical assessment 102 attributes 108 data also are known. The six technical measures described above were used to assess various attributes of the Samples-1-7. It is also assumed that the attributes 108 and the respective attributes are the same as those indicated above in TABLES 1-6. It is further assumed that, based on the perceptual map 204 technique, three dimensions are identified from the attributes that explain 66% of the variability among all the attributes of the seven Samples-1-7. The dimensions are the most important attributes or key drivers for predicting the consumer acceptance of any one of the Samples-1-7. This hypothetical analysis indicates that 66% of the variability among the Samples-1-7 can be accounted with just three key sensory dimensions: Dimension 1, Dimension 2, and Dimension 3.

Dimension 1: "Attributes Associated With Aldehydes To Acids & Chicken"=25%
Dimension 2: "Sample-7"=23%
Dimension 3: "Sample-6"=18%

TABLE 7 indicates the Dimension 1 factor loading values for each sensory attribute 108 highly associated with this dimension (factor).

TABLE 7

| FACTOR 1 (25%) | | |
|---|---|---|
| SOURCE | ATTRIBUTE | LOADING |
| AFS | Rate Of Eating (Gm/Min) | 0.78 |
| CHEM | Acid, Acetic, Butanoic | 0.90 |
| CHEM | Propyl Acetate | 0.90 |
| CHEM | Dmms | 0.84 |
| CHEM | Propanoic Acid | 0.82 |
| CHEM | 2-Pentyl Furan | 0.75 |
| CHEM | Furfural, 3,5-Octadiene-2-One | 0.67 |
| HUMAN | Chicken | 0.93 |
| HUMAN | Oily/Fatty | 0.82 |
| HUMAN | Yeast | 0.78 |

TABLE 7-continued

| FACTOR 1 (25%) | | |
|---|---|---|
| SOURCE | ATTRIBUTE | LOADING |
| VIDEO | Paws Against Edge Of Bowl | 0.93 |
| VIDEO | Eats Normally | 0.67 |
| VIDEO | Paws Away From Edge Of Bowl | 0.63 |
| AN | Protein (%) | −0.71 |
| CHEM | TMA (½ Of 58) | −0.81 |
| CHEM | Nonanal | −0.73 |
| CHEM | Propanal, TMA (2x Of 59) | −0.72 |
| CHEM | Hexanal, 2-M-Propanal, Butanal, 2-Butanone | −0.70 |
| CHEM | Dmds | −0.62 |
| VIDEO | Drops Kibbles On Floor To Eat | −0.96 |
| VIDEO | At Bowl Stands While Eating | −0.88 |
| VIDEO | At Bowl Tail Down | −0.85 |
| VIDEO | Sits While Eating | −0.82 |
| VIDEO | Stands While Eating | −0.79 |
| VIDEO | Time At Bowl (Min/Sec) | −0.78 |
| VIDEO | Meowed (# Time) | −0.72 |
| VIDEO | Licking Lips (# Time) | −0.63 |

Dimension 1 explains 25% of the variability in the ratings of the seven Samples-1-7. Higher ratings on the positively loaded attributes such as "Rate of Eating," "Acid, Acetic, Butanoic," "Propyl Acetate," "Chicken," and "Paws Against Edge Of Bowl" increase a sample's position on the dimension. Higher ratings on the negatively loaded attributes such as "Protein (%)," "TMA (½ of 58)," "Drops Kibbles On Floor To Eat," and "At Bowl Stands While Eating" decreases a sample's position on the dimension.

TABLE 8 indicates the Dimension 2 factor loading values for each sensory attribute 108 highly associated with this dimension (factor).

TABLE 8

| FACTOR 2 (21%) | | |
|---|---|---|
| SOURCE | ATTRIBUTE | LOADING |
| AFS | Total Amount Consumed (g) | 0.96 |
| AFS | Number Of Feeding Events | 0.90 |
| AFS | Total Time At Bowl In Study Day (Sec) | 0.88 |
| AFS | Max. Consumed In 1 Event (g) | 0.71 |
| AFS | Time To First Event Of Day (Min) | 0.69 |
| CHEM | 2,6-Dimethylpyrazine, 2-Ethylpyrazine | 0.83 |
| HUMAN | Sweet | 0.87 |
| HUMAN | Grainy | 0.82 |
| HUMAN | Toast | 0.60 |
| VIDEO | Shakes Ears | 0.92 |
| VIDEO | Sniff Bowl And Eat | 0.86 |
| VIDEO | Leaves Bowl & Return (# Of Time) | 0.71 |
| VIDEO | Gulping (# Times) | 0.67 |
| VIDEO | Ate From Right Side Of Bowl | 0.65 |
| VIDEO | Lick Lips After Eating Food | 0.65 |
| AN | Moisture (%) | −0.76 |
| AN | Ash (%) | −0.72 |
| CHEM | Hc, Hexane, Aldehyde | −0.98 |
| CHEM | Hc, Aldehydes | −0.96 |
| CHEM | 2/3-Methyl-Butanal, Aldehyde | −0.89 |
| CHEM | Hexanal | −0.87 |
| CHEM | 2-Etylfuran, 2-Pentylfuran, 2,4-Hehprdienal | −0.84 |
| CHEM | Heptanal, Isoamyl Alcohol | −0.74 |
| CHEM | Butanoic Acid, 2-M-Butanoic Acid | −0.72 |
| HUMAN | Fish | −0.70 |
| HUMAN | Dirty Socks | −0.64 |

The Product Sample-7 is highly positively correlated with Dimension 2. It is higher than the other Product Samples-1-6 in the positively loaded attributes such as "Total Amount Consumed," "Shakes Ears," and "2, 6-dimethlypyrazine, 2-ethylpyrazine." It is lower in the negatively loaded attributes such as "HC, Hexane, Aldehyde."

TABLE 9 indicates the Dimension 3 factor loading values for each sensory attribute 108 highly associated with this dimension (factor).

TABLE 9

| FACTOR 3 (18%) | | |
|---|---|---|
| SOURCES | ATTRIBUTE | LOADING |
| AFS | Duration At Bowl For First Event Of Day (Sec) | 0.77 |
| AFS | Rate Of Eating At First Event Of Day (Gm/Min) | 0.67 |
| AFS | Amount Consumed At First Event Of Day (g) | 0.62 |
| CHEM | Benzaldehyde | 0.83 |
| CHEM | Methional | 0.71 |
| HUMAN | Cardboard | 0.75 |
| VIDEO | Ate From Left Side Of Bowl | 0.88 |
| VIDEO | Ate From Front Of Bowl | 0.87 |
| VIDEO | At Bowl Throw Food Out Of Bowl | 0.81 |
| VIDEO | Moves Closer To Bowl | 0.80 |
| VIDEO | At Bowl Licks Lips | 0.80 |
| VIDEO | At Bowl Wags Tail | 0.79 |
| VIDEO | Ate From Far Side Of Bowl | 0.73 |
| VIDEO | At Bowl Tail On Floor | 0.72 |
| VIDEO | At Bowl Sits Down | 0.66 |
| VIDEO | Eats Eagerly | 0.61 |
| CHEM | 2-Methyl Butanal | −0.87 |
| HUMAN | Earthy | −0.60 |
| PREF | Preference Converted Food Intake | −0.71 |
| PREF | First Bite Average | −0.63 |
| VIDEO | Stayed At Bowl Until Finished | −0.93 |
| VIDEO | Eats From Bowl | −0.89 |

The Product Sample-6 is highly positively correlated with Dimension 3. The Product Sample-6 is higher in the positively loaded attributes such as "Duration At Bowl For First Event Of Day," "Benzalydehyde," "Cardboard," and "Ate From Left Side Of Bowl." The Sample-6 is lower than other samples in the negatively loaded attributes such as "2-Methyl Butanal," "Earthy," "Preference Converted Food Intake," and "Stayed At Bowl Until Finished."

Figure 3:
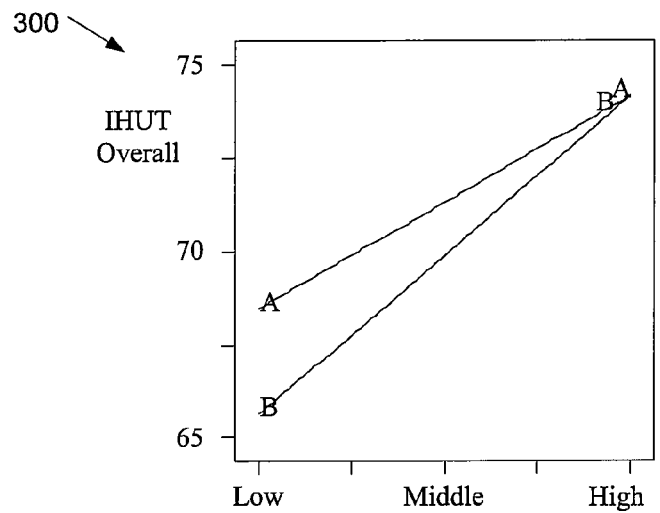
FIG. 3 is a diagram of two dimensions (factors) associated with an in-home use test (IHUT) overall acceptance response (OAR).

FIG. 3 is a diagram 300 of two dimensions (factors) associated with an IHUT OAR. The vertical axis represents IHUT OAR and the horizontal axis represents the factor ranges: Low, Medium, and High. In the diagram 300, A=Dimension 1 and B=Dimension 2. It is desirable that both Dimensions 1 and 2 have attributes 108 with high value desirable sensory attributes. The key drivers model explains 76% of the impact of the dimensions on overall acceptance. In the illustrated diagram 300 based on the above example, Dimensions 1 and 2 are the key drivers. It is important to have high factor ranges in both dimensions.

Key attributes associated with increased consumer OAR are based on the animal feeding behaviors described by the product attributes 108. The animal feeding behaviors associated with increased consumer OARs are: fast rate of eating; increased amount of food consumed upon initial food presentation; increased number of trips to the bowl; stays at bowl longer; sniff bowl and then eats; and minimal dropping of kibbles on the floor while eating. The product attributes associated with increased consumer OARs are: elevated chicken, oily, yeast, sweet, grainy, toast aroma character of product; desirable aromatic compounds such as acids (acetic, propionic, butyric), nutty; low in fish, dirty socks aroma; and low in undesirable compounds: trimethylamine, aldehydes.

Dimension 1 is characterized by the following high and low predictor variable 108 attributes as indicated in TABLE 10A.

TABLE 10A

| | High Predictor Variable Attributes |
|---|---|
| AFS | Rate Of Eating (g/min) |
| HEM | Acid, Acetic, Butanoic, Propyl Acetate, Dmms, Propanoic Acid |
| HUMAN | Chicken, Oily/Fatty, Yeast |
| VIDEO | Paws Against Edge Of Bowl, Eats Normally, Paws Away From Edge Of Bowl |
| | Low Predictor Variable Attributes |
| AN | Protein (%) |
| CHEM | TMA (½ of 58), nonanal, Propanal, TMA (2x of 59) |
| VIDEO | Drops Kibbles On Floor To Eat, At Bowl Stands While Eating, At Bowl Tail Down |

Stated in terms of Feeding Behavior and Product Attributes, Dimension 1 may be characterized as indicated in TABLE 10B.

TABLE 10B

| | Feeding Behavior |
|---|---|
| AFS | Fast Rate Of Eating (g/min) |
| VIDEO | Minimal Dropping Of Kibbles On The Floor While Eating |
| | Product Attributes |
| HUMAN | Elevated Chicken, Oily, And Yeast Aroma Character Of Product |
| CHEM | Desirable Aromatic Compounds Such As Acids (Acetic, Propionic, Butyric) |
| CHEM | Low In Undesirable Compounds: Trimethylamine |

Dimension 2 is characterized by the following high and low predictor variable 108 attributes as indicated in TABLE 11A.

TABLE 11A

| | Feeding Behavior |
|---|---|
| AFS | Increased Amount Of Food Consumed Upon Initial Food Presentation |
| AFS | Increased Number Of Trips To The Bowl |
| AFS | Stays At Bowl Longer |
| AFS | Sniffs Bowl And Then Eats |
| | Product Attributes |
| AN | Moisture (%), Ash (%) |
| CHEM | HC, Hexane, Aldehyde, HC, Aldehydes, 2/3-Methyl-Butanal, Aldehyde, Hexanal |
| VIDEO | Fish, Dirty Socks |

Stated in terms of Feeding Behavior and Product Attributes, Dimension 2 may be characterized as indicated in TABLE 11B.

TABLE 11B

| | Feeding Behavior |
|---|---|
| AFS | Fast rate of eating (gm/min) |
| VIDEO | Minimal Dropping Of Kibbles On The Floor While Eating |
| | Product Attributes |
| HUMAN | Elevated Sweet, Grainy, And Toast Aroma Character Of Product |
| HUMAN | Desirable Aromatic Compounds Such As Nutty |
| HUMAN | Low in fish, dirty socks aroma |
| CHEM | Low In Undesirable Compounds: Aldehydes |

Figure 4:
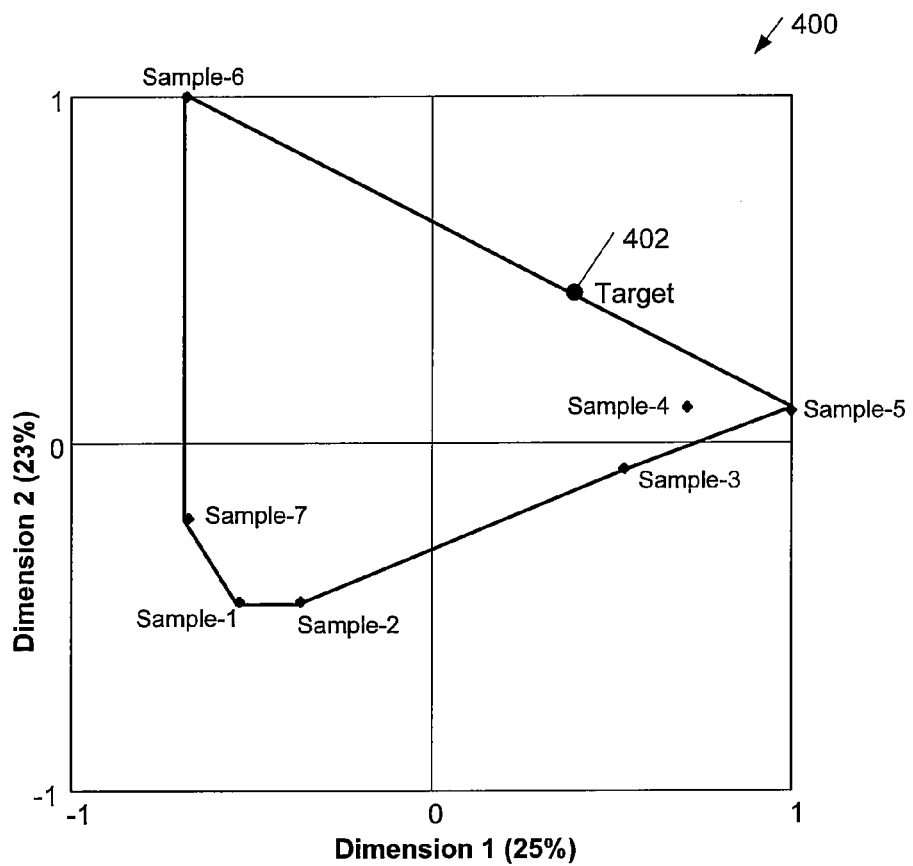
FIG. 4 illustrates a perceptual map of a target profile that achieves superior consumer acceptance based on two main dimensions (factors).

FIG. 4 illustrates a perceptual map 400 of a target profile that achieves superior consumer acceptance based on two main factors dimensions. The vertical axis represents Dimension 2 (23%) and the horizontal axis represents Dimension 1 (25%). The perceptual map 400 indicates where each of the seven Samples-1-7 is located on the perceptual map 400 with respect to the two main factors Dimensions 1 and 2. The perceptual map 400 illustrates a visual target profile of a product that would have superior consumer acceptance (i.e., OAR). The model is capable of generating a list of specific attributes needed to achieve a desired target 402. As additional sample products are entered in the database, the target 402 is updated and a specific profile available for a product formulation that meets the target 402. As the database continues to acquire additional sample products data the predictive model gains greater predictiveness based on an increasingly larger database of sample products for which both technical measures (attributes) data and consumer response data are known.

Accordingly, a consumer response predictive model can be created to explain a majority of the key liking drivers of the IHUT feeding experience by using the determined technical measures to define the relevant product attributes 108. The technical measures and the attributes 108 may be selected based on their relevance to the feeding experience 122. Results from the predictive model can be used to: 1) guide continued refinement of capabilities, 2) provide product sensorial insights as noted above, and 3) identify gaps in current sensory capabilities. As a greater amount of Sample Products-1-N, where N is any integer, are entered in the database, it will be possible to create a target profile of a product that has the most desirable consumer acceptance. Additional advantages of the predictive model include increasing product development speed (by predicting consumer response on early prototypes) and avoiding consumer tests (e.g., each product tested IHUT costs several thousand dollars). In other embodiments, the database may employ a more diverse product base to achieve a more robust model. Development of data management techniques and statistical analysis capabilities can be employed to sustain the database and modeling the data.

Figure 5:
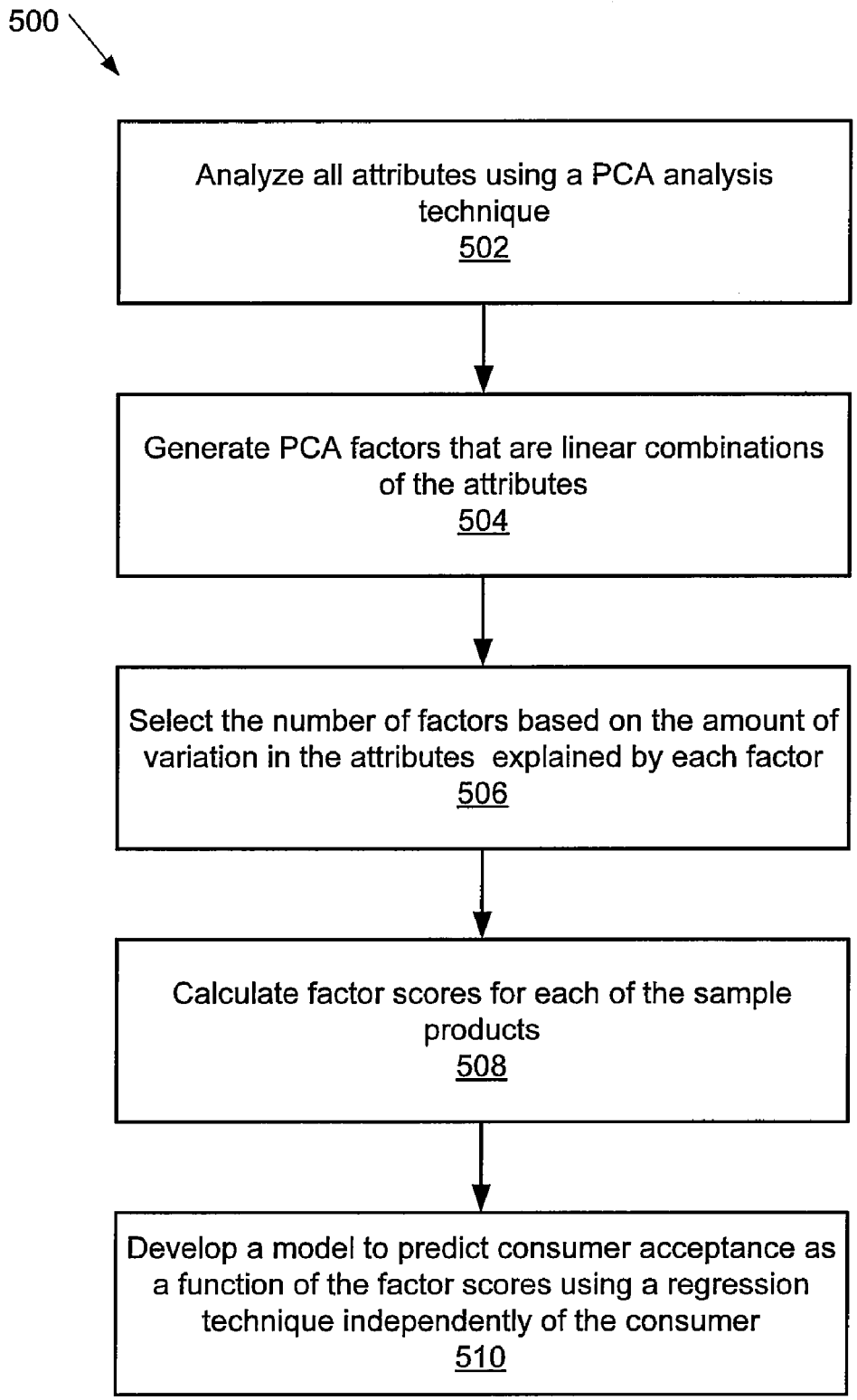
FIG. 5 illustrates one embodiment of a method of generating a consumer acceptance independently of the consumer.

FIG. 5 illustrates one embodiment of a method 500 of generating a consumer acceptance independently of the consumer. In one embodiment, the predictive model predicts consumer acceptance of an animal feeding experience independently of the consumer. Analyze 502 all the attributes 108 using a PCA analysis technique. As previously discussed the attributes 108 describe the feeding experience 122 based on analytical as well as sensory variables. The attributes 108 may comprise, for example, analytical components 110 (AN), daily feeding patterns 112 based on automatic feeding station (AFS), chemical sensor such as headspace aroma compounds 114 (CHEM), human sensory descriptive panel 116 (HUMAN), monadic feeding behaviors 118 (VIDEO), and preference assessment 120 (PREF). Generate 504 PCA factors that are linear combinations of the attributes 108. Select 506 the number of factors based on the amount of variation in the attributes 108 explained by each factor. Calculate 508 factor scores for each of the sample products 210 (e.g., based on observations of the feeding experience of the animal). Develop a model to predict consumer acceptance 510 as a function of the factor scores using a regression technique independently of the consumer. The regression technique may be employed to generate a model to predict the overall consumer acceptance. The output of the predictive model is the consumer acceptance (e.g., OAR) based on the factor scores obtained from the attributes 108 and is determined independently of an actual consumer test such as an IHUT. Accordingly, the consumer response is determined based on the predictive model independently of the consumer. The computations described in the method 500 may be performed in accordance with the methods described herein in FIGS. 1-4, for example.

Figure 6:
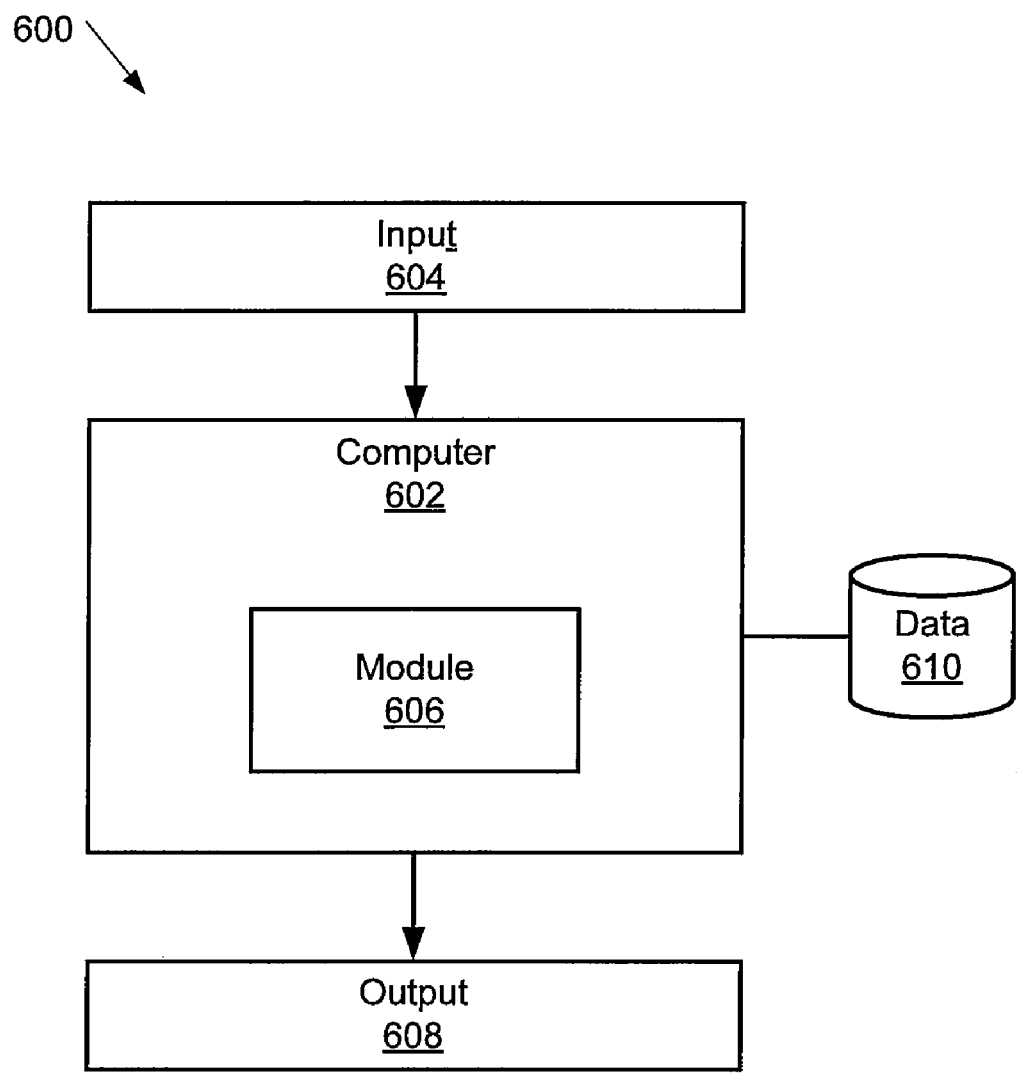
FIG. 6 is a diagram of one embodiment of a system that may be employed to generate a predictive model using the techniques described above.

FIG. 6 is a diagram of one embodiment of a system 600 that may be employed to generate a predictive model using the techniques described above. A computer 602 receives inputs 604 comprising product attributes 108 generated using the technical assessment 102. The computer 602 a processor and an application module 606 to execute the method 500 of generating a predictive model described above with respect to FIGS. 1-5. The computer 602 outputs 608 the consumer response based on the predictive model independently of the consumer. A database 610 stores data sets associated with known technical measures data and consumer response data. The predictive model gains greater predictiveness as the database continues to acquire technical measures data and consumer response data, based on an increasingly larger dataset of "known" values.

The computer 602 may comprise a processor, a monitor, a microphone, and/or a video camera in addition to a mouse, keyboard and standard I/O ports (not shown). The processor may be implemented as a general purpose processor. For example, the processor may comprise a general purpose processor made by Intel® Corporation, Santa Clara, Calif. The processor also may comprise a dedicated processor, such as a controller, microcontroller, embedded processor, a digital signal processor (DSP), a network processor, an input/output (I/O) processor, a media processor, and so forth. The computer 602 may comprise devices for Internet access. The computer 602 is not limited by any type of processor, particular hard disk drive, memory, sound card, or video card.

In one embodiment, the server computer 602 may comprise a memory. The memory may comprise any machine-readable or computer-readable media capable of storing data, including both volatile and non-volatile memory. For example, the memory may comprise read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The memory also may comprise storage devices such as magnetic or optical disk drives for storage and data base implementation.

The computer 602 may include an operating system and application software, such as Microsoft® Windows, Microsoft® Internet Explorer®, voice recognition software, voice synthesis software, and video input. The computer 602 may comprise an application module 604 to execute the necessary statistical techniques described herein to generate a consumer predictive model independently of the consumer. It will be appreciated by those of ordinary skill in the art that other operating system software, such as UNIX, LINUX, OS/2, BE, System 7, Solaris, Mac OS may be employed by the computer 602 components. Likewise, the system 600 communication components are not limited by any particular communication software.

In one embodiment, the computer 602 may comprise a framework of interfaced software modules, which may retrieve, process, create, format, and transmit certain data. In one embodiment, the computer 602 executes modules to direct and control certain processes to be carried out by other modules such as the application module 606. These modules may interact with other software modules, such as services provided by the operating system or such as Internet connection, communication and transmission functions provided by an Internet browser module. Thus, in one embodiment, the modules are generally comprised of software instructions executable by the processor.

In various implementations, the computer 602 may be illustrated and described as comprising several separate functional elements, such as modules. Although certain modules may be described by way of example, it can be appreciated that a greater or lesser number of modules may be used and still fall within the scope of the embodiments. Further, although various embodiments may be described in terms of modules to facilitate description, such modules may be implemented by one or more hardware components (e.g., processors, application specific integrated circuit [ASIC], Programmable Logic Device [PLD] or digital signal processor [DSP] circuits, registers), software components (e.g., programs, subroutines, logic) and/or combination thereof.

The modules may comprise, or be implemented as, one or more software or hardware elements, or any combination thereof, as desired for a given set of design or performance constraints. Thus, as used herein, the term "module" refers not only to logic coded as a collection of software instructions, but also refers to logic embodied in hardware or firmware. In the software context, a module may have entry and exit points and may be coded in a high level language such as C, C++, Java, or Pascal, or may be coded in machine or assembler language. Software modules may be compiled and linked into an executable program or installed in a Dynamic Link Library (DLL). Software modules may also be coded in an interpretive language, such as BASIC. Software modules may be callable from other modules, may be nested within other modules, and/or may be invoked in response to a detected event or interrupt. Instructions of software modules may be coded into firmware, such as an EPROM. For example, the modules may comprise electronic elements fabricated on a substrate. In the hardware context, modules may be comprised of connected logic units, such as gates and flip-flops, and/or may be comprised of programmable units, such as programmable gate arrays. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, or DSP, and so forth. In yet another example, an embodiment may be implemented by any combination of programmed general-purpose computer components and custom hardware components. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes, and equivalents will now occur to those skilled in the art. It is therefore to be understood that the appended claims are intended to cover all such modifications and changes as fall within the true spirit of the embodiments.

What is claimed is:

1. A method of determining a consumer response, the method comprising:
    determining at least two attributes obtained for a sample product, the at least two attributes associated with a feeding experience of an animal;
    representing the at least two attributes as electronic data;
    performing a regression analysis using the electronic data representing the at least two attributes, wherein the regression analysis is performed by a processor;
    generating a predictive model based upon the regression analysis;
    observing an animal's behavior;
    inputting information associated with the animal's behavior into the predictive model to generate a response; and
    determining a consumer response of the feeding experience, independently of the consumer, as a function of the predictive model's response to the information associated with the animal's behavior.

2. The method of claim 1, comprising:
    determining the at least two attributes based on an assessment of a plurality of technical measures associated with the feeding experience of an animal.

3. The method of claim 2, wherein the technical measures are selected from the group consisting of analytical components (AN), daily feeding patterns based on automatic feeding station (AFS), chemical sensory headspace aroma compounds (CHEM), human sensory descriptive panel (HUMAN), monadic feeding patterns (VIDEO), and preference assessment (PREF).

4. The method of claim 1, comprising performing a regression analysis using a multivariate regression analysis.

5. The method of claim 4, comprising:
    performing a principle component analysis of the at least two attributes associated with the feeding experience;
    generating factors that are linear combinations of the at least two attributes;
    calculating factor scores for the sample product; and
    determining the consumer response of the feeding experience as a function of the factor scores using the multivariate regression analysis independently of the consumer.

6. The method of claim 5, comprising selecting the number of factors based on the amount of variation accounted for by each one of the at least two attributes.

7. The method of claim 1, comprising:
    determining a linear model to describe the at least two attributes.

8. The method of claim 1, wherein the animal comprises a companion animal.

9. The method claim 8, wherein the companion animal is selected from the group consisting of a dog, a cat, a horse, a gerbil, a mouse, a rat, and a ferret.

10. A method of generating a model to predict a consumer response, the method comprising:
    determining at least two attributes obtained for a sample product, the at least two attributes associated with a feeding experience of an animal;
    representing the at least two attributes as electronic data;

determining a consumer response of the feeding experience based upon the consumer;
representing the consumer response as electronic datum or data;
linking the electronic data representing the at least two attributes with the electronic data representing the consumer response using a regression technique, wherein linking the electronic data is performed by a processor;
generating a predictive model based upon the regression technique;
observing an animal's behavior;
inputting information associated with the animal's behavior into the predictive model to generate a response; and
determining a consumer response of the feeding experience, independently of the consumer, as a function of the predictive model's response to the information associated with the animal's behavior.

11. The method of claim 10, comprising performing a multivariate regression analysis of the at least two attributes prior to the linking of the at least two attributes with the consumer response using the multivariate regression analysis.

12. The method of claim 11, comprising performing a factor analysis of the at least two attributes prior to the linking of the at least two attributes with the consumer response using the multivariate regression analysis.

13. The method of claim 11, comprising performing a partial least squares analysis of the at least two attributes prior to the linking of the at least two attributes with the consumer response using the multivariate regression analysis.

14. A system, comprising:
a processor; and
a module comprising executable instructions that when executed by the processor cause the processor to receive at least two attributes obtained for a sample product, the at least two attributes are associated with a feeding experience of an animal; perform a regression analysis using the at least two attributes; generate a predictive model based upon the regression analysis; receive information associated with the animal's behavior; input the information associated with the animal's behavior into the predictive model to generate a response; and determine a consumer response of the feeding experience, independently of the consumer, as a function of the predictive model's response to the information associated with the animal's behavior.

15. The system of claim 14, comprising performing a regression analysis using a multivariate regression analysis.

16. The system of claim 15, wherein the instructions cause the processor to perform a principle component analysis of the at least two attributes associated with the feeding experience; generate factors that are linear combinations of the at least two attributes; calculate factor scores for the sample product; and determine the consumer response of the feeding experience as a function of the factor scores using the multivariate regression analysis independently of the consumer.

17. The system of claim 16, wherein the instructions cause the processor to select the number of factors based on the amount of variation accounted for by each one of the at least two attributes.

18. The system of claim 15, wherein the instructions cause the processor to determine the consumer response of the feeding experience as a function of the at least two attributes independently of the consumer.

19. The system of claim 14, comprising a database in communication with the processor to store data sets associated with a plurality of known technical measures associated with the feeding experience of an animal and consumer responses.

20. A system, comprising:
a processor; and
a module comprising executable instructions that when executed by the processor cause the processor to receive at least two attributes associated with a feeding experience of an animal; determine a consumer response of the feeding experience based upon the consumer; link the at least two attributes with the consumer response using a regression technique; generate a predictive model based upon the regression technique; receive information associated with the animal's behavior; input information associated with the animal's behavior into the predictive model to generate a response; and determine a consumer response of the feeding experience, independently of the consumer, as a function of the predictive model's response to the information associated with the animal's behavior.

21. The system of claim 20, wherein the instructions cause the processor to perform a multivariate regression analysis of the at least two attributes prior to the linking of the at least two attributes with the consumer response using the multivariate regression analysis.

22. The system of claim 21, wherein the instructions cause the processor to perform a factor analysis of the at least two attributes prior to the linking of the at least two attributes with the consumer response using the multivariate regression analysis.

23. The system of claim 21, wherein the instructions cause the processor to perform a partial least squares analysis of the at least two attributes prior to the linking of the at least two attributes with the consumer response using the multivariate regression analysis.

24. The system of claim 20, comprising a database in communication with the processor to store data sets associated with a plurality of known technical measures associated with the feeding experience of an animal data and consumer response data.

* * * * *